United States Patent [19]

Keogh

[11] 4,446,279

[45] * May 1, 1984

[54] COMPOSITIONS BASED ON A POLYSILOXANE AND AN ORGANO TITANATE AND THE USE THEREOF IN THE PREPARATION OF WATER CURABLE, SILANE MODIFIED ALKYLENE-ALKYL ACRYLATE COPOLYMERS

[75] Inventor: Michael J. Keogh, Bridgewater, N.J.

[73] Assignee: Union Carbide Corporation, Danbury, Conn.

[ * ] Notice: The portion of the term of this patent subsequent to May 4, 1999 has been disclaimed.

[21] Appl. No.: 467,318

[22] Filed: Feb. 23, 1983

Related U.S. Application Data

[63] Continuation-in-part of Ser. No. 351,212, Feb. 22, 1982, which is a continuation-in-part of Ser. No. 192,319, Sep. 30, 1980, Pat. No. 4,328,323, which is a continuation-in-part of Ser. No. 70,785, Aug. 19, 1979, Pat. No. 4,291,136, which is a continuation-in-part of Ser. No. 892,153, Mar. 31, 1978, abandoned.

[51] Int. Cl.$^3$ .................................................. C08F 8/00
[52] U.S. Cl. .................................. 525/106; 524/141; 524/382; 524/385; 524/430; 524/433; 524/436; 524/437; 524/783; 428/390; 428/447; 264/174
[58] Field of Search ............... 524/382, 141, 385, 430, 524/433, 436, 437, 783; 428/411; 264/174; 525/106

[56] References Cited

U.S. PATENT DOCUMENTS

| | | | |
|---|---|---|---|
| 2,716,656 | 8/1955 | Boyd | 260/429 |
| 2,984,641 | 5/1961 | Wolinski | 524/382 |
| 3,057,822 | 10/1962 | Rust et al. | 525/475 |
| 3,677,998 | 7/1972 | Young | 524/382 |
| 3,687,882 | 8/1972 | Bishop | 524/389 |
| 4,291,136 | 9/1981 | Keogh | 525/102 |
| 4,299,713 | 11/1981 | Maringer et al. | 174/110 S |
| 4,328,323 | 5/1982 | Keogh | 525/106 |

FOREIGN PATENT DOCUMENTS

| | | |
|---|---|---|
| 4752 | 10/1979 | European Pat. Off. . |
| 19831924 | of 0000 | Japan . |
| 872411 | 7/1959 | United Kingdom . |
| 2101138 | 1/1983 | United Kingdom . |

OTHER PUBLICATIONS

1,2-Siloxyacycloalkanes, Part 1: Synthesis and Polymerization Properties Research Laboratories of Th. Goldschmidt AG, Essen, Ruhr, West Germany, 1963, Gerd Rossmy and Götz Koerner, pp. 1 through 31.

Siloxane Bond, Siberian Division of U.S.S.R. Academy of Sciences, Novossibirsk, 1976, Nauka Publishers, M. G. Voronkov et al., pp. 221–222 (fragment).

*Primary Examiner*—Melvyn I. Marquis
*Attorney, Agent, or Firm*—James C. Arvantes; Robert C. Brown

[57] ABSTRACT

The disclosure of this application is directed to a composition comprising a polysiloxane and an organo titanate, water curable, silane modified alkylene-alkyl acrylate copolymer produced therefrom and flame retardant compositions, devoid of halogenated flame retardant additives, based on water curable, silane modified alkylene-alkyl acrylate copolymers.

32 Claims, No Drawings

COMPOSITIONS BASED ON A POLYSILOXANE AND AN ORGANO TITANATE AND THE USE THEREOF IN THE PREPARATION OF WATER CURABLE, SILANE MODIFIED ALKYLENE-ALKYL ACRYLATE COPOLYMERS

This application is a continuation-in-part of my copending application Ser. No. 351,212 filed Feb. 22, 1982 which in turn is a continuation-in-part of application Ser. No. 192,319 filed Sept. 30, 1980, now U.S. Pat. No. 4,328,323 granted May 4, 1982, which in turn is a continuation-in-part of application Ser. No. 70,785 filed Aug. 19, 1979, now U.S. Pat. No. 4,291,136 granted Sept. 22, 1981, which in turn is a continuation-in-part of application Ser. No. 892,153 filed Mar. 31, 1978, now abandoned.

SUMMARY OF THE INVENTION

This invention relates to compositions comprising a polysiloxane and an organo titanate and the use thereof in the production of water curable, silane modified alkylene-alkyl acrylate copolymers which can be applied as extrudates about wires and cables. Compositions of this invention provide improved processing and cost advantages in the manufacture of wires and cables having as extrudates thereon water curable, silane modified alkylene-alkyl acrylate copolymers.

BACKGROUND OF THE INVENTION

Silane modified, alkylene-alkyl acrylate copolymers, as described in my U.S. Pat. No. 4,328,323 granted May 4, 1982, are particularly desirable for use in commercial applications as these copolymers and compositions based thereon can be cured by a simple water treatment, as opposed to the more conventional peroxide curing. As a result, silane modified alkylene-alkyl acrylate copolymers and compositions based thereon are especially useful in extrusion applications, being capable of extrusion under a wide latitude of processing conditions.

The production of water curable, silane modified alkylene-alkyl acrylate copolymers is conveniently carried out by reacting a mixture containing a polysiloxane, an alkylene-alkyl acrylate copolymer and organo titanate with the result that the polysiloxane reacts with the alkylene-alkyl acrylate copolymer, the reaction being catalyzed by the organo titanate.

In carrying out the reaction, care must be taken to protect the polysiloxane from moisture. Polysiloxanes hydrolyze rapidly on contact with moisture and cross-link to gelled products, which for all practical purposes, are useless. Furthermore, the problem associated with moisture is accentuated when the formulations of the compositions include hydrous or water-releasing fillers which, through reaction or catalysis cause the compositions to prematurely crosslink. Premature cross-linking, commonly referred to as scorch, usually occurs in the extruder wherein the compositions are processed, undergo a reaction and are extruded about wires and cables. In extreme cases, scorching necessitates stopping of the extrusion operation and cleaning of the extruder.

DETAILED DESCRIPTION OF THE INVENTION

In one aspect of the present invention, compositions are provided comprising a polysiloxane and an organo titanate wherein the organo titanate is present in an amount sufficient to inhibit the adverse effects of moisture, present in the composition or generated therein during processing. Generally, the weight ratio of organo titanate to polysiloxane is at least about 0.5 to 1, generally about 1.5 to about 10 to one and preferably about 1.5 to about 5 to one.

Compositions as described in the preceeding paragraph are not only resistant to the adverse effects of moisture, but in addition, provide a number of other advantages.

At the level of organo titanate defined, it is possible to reduce the amount of polysiloxane used in formulating compositions containing polysiloxanes and alkylene-alkyl acrylate copolymers, reacted to produce water curable, silane modified alkylene-alkyl acrylate copolymers. As a result, a cost advantage is realized since polysiloxanes are more expensive than organo titanates. In addition, a process advantage is realized as reducing the amount of polysiloxane reduces the surging in the extruder wherein the polysiloxane and alkylene-alkyl acrylate copolymer are processed, reacted and extruded onto wires and cables. This results in wires and cables having coatings of more uniform thickness.

Another advantage which inures from the present invention is that compositions can be formulated, containing hydrous and/or water-releasing fillers, which are resistant to scorch during the processing thereof, scorch being a function of time and temperature.

A particular advantage of the present invention is that flame retardant compositions can be formulated, devoid of halogenated flame retardant additives.

As to this feature and in another aspect of the present invention, compositions are provided comprising a water curable, silane modified alkylene-alkyl acrylate copolymer, an organo titanate in an amount sufficient to neutralize the adverse effects of moisture under the processing conditions to which the composition is being subjected, aluminum trihydrate or magnesium hydroxide and a scorch inhibiting compound.

Polysiloxanes, which are suitable for purposes of the present invention, containing repeating units of the formula:

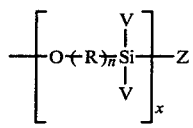

Formula I wherein R is a hydrocarbon radical or oxy substituted hydrocarbon radical, each V, which can be the same or different, is hydrogen, a hydrocarbon radical or a hydrolyzable group; Z is a hydrolyzable group, n is an integer having a value of one to 18 inclusive and x is an integer having a value of at least 2, generally 2 to 1000 inclusive, preferably 5 to 25 inclusive.

Illustrative of suitable hydrocarbon radicals for R are alkylene radicals having one to 18 carbon atoms inclusive, preferably one to 6 carbon atoms inclusive, such as methylene, ethylene, propylene, butylene, hexylene and the like; alkoxy radicals having one to 18 carbon atoms inclusive, preferably one to 6 carbon atoms inclusive such as methyloxymethyl, methyloxypropyl, ethyloxyethyl, ethyloxypropyl, propyloxypropyl, propyloxybutyl, propyloxyhexyl and the like.

As stated, each V can be hydrogen, a hydrocarbon radical or a hydrolyzable group. Illustrative of suitable radicals are alkyl radicals having one to 18 carbon atoms inclusive, preferably one to 6 carbon atoms inclusive such as methyl, ethyl, n-propyl, isopropyl, n-butyl, n-hexyl and the like; alkoxy radicals having one to 18 carbon atoms inclusive, preferably one to 6 carbon atoms inclusive, such as methoxy, ethoxy, propoxy, hexoxy, dodecyloxy, methoxyethoxy and the like; aryl radicals having 6 to 8 carbon atoms inclusive such as phenyl, methyl phenyl, ethyl phenyl and the like; cycloaliphatic radicals having 5 to 8 carbon atoms inclusive such as cyclopentyl, cyclohexyl, cyclohexyloxy and the like.

Z, as previously stated, is a hydrolyzable group among which can be noted alkoxy radicals as previously described for V; oxy aryl radicals such as oxyphenyl and the like; oxyaliphatic radicals such as oxyhexyl and the like; halogens such as chlorine and the like.

Polysiloxanes containing repeating units falling within the cope of Formula I can be prepared as described in my U.S. Pat. No. 4,328,323 by condensing and polymerizing a silane falling within the scope of Formula II.

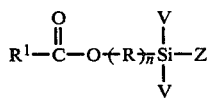

Formula II wherein $R^1$ is a hydrocarbon radical, as for example an alkyl radical having one to 18 carbon atoms inclusive, preferably one to four carbon atoms inclusive such as methyl, ethyl, n-propyl, isopropyl, n-butyl and the like; alkylene radicals having two to 18 carbon atoms inclusive, preferably two to 4 carbon atoms inclusive such as ethylene, propylene and the like; aryl radicals having six to ten carbon atoms inclusive such as phenyl, benzyl and the like. Other variables are as previously defined.

Exemplary of suitable silanes falling within the scope of Formula II are the following:

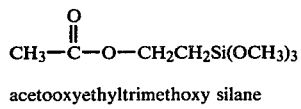

acetooxyethyltrimethoxy silane

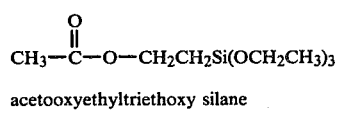

acetooxyethyltriethoxy silane

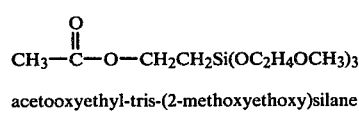

acetooxyethyl-tris-(2-methoxyethoxy)silane

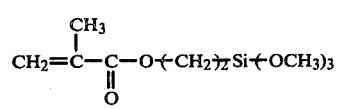

β-methacryloxyethyltrimethoxy silane

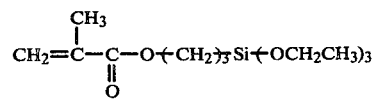

γ-methacryloxypropyltriethoxy silane

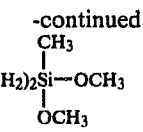

acetooxyethylmethyldimethoxy silane

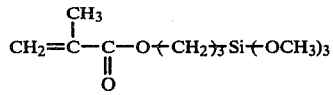

γ-methacryloxypropyltrimethoxy silane

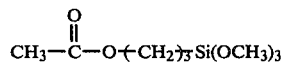

acetooxypropyltrimethoxy silane

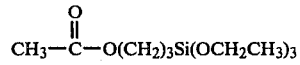

acetooxypropyltriethoxy silane

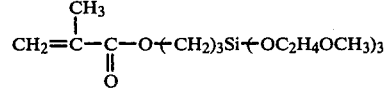

γ-methacryloxypropyl-tris-(2-methoxyethoxy)silane

Preferred polysiloxanes have a viscosity of about 0.5 poise to about 150 poise, preferably about one to about 20 poise as determined by a Gardner-Holt bubble viscometer at a temperature of 25° C.

Among organo titanates, which are suitable for purposes of this invention, are those falling within the scope of Formula III.

$Ti(OR^2)_4$  Formula III wherein each $R^2$, which can be the same or different, is hydrogen or a hydrocarbon radical having one to 18 carbon atoms inclusive, preferably one to 14 carbon atoms inclusive. By definition of a titanate, one $R^2$ must be a hydrocarbon radical.

Exemplary of suitable hydrocarbon radicals are alkyl radicals such as methyl, ethyl, n-propyl, isopropyl, butyl, octyl, lauryl, myristyl, stearyl and the like, cycloaliphatic radicals such as cyclopentyl, cyclohexyl and the like, aryl radicals such as phenyl, methylphenyl, chlorophenyl and the like; alkaryl radicals such as benzyl and the like.

Particularly desirable titanates falling within the scope of Formula III are those wherein each $R^2$ is alkyl having one to 18 carbon atoms inclusive, preferably one to 14 carbon atoms inclusive, exemplified by tetrabutyl titanate, tetraisopropyl titanate and the like.

Organo titanates falling within the scope of Formula III are known compounds and can be conveniently prepared as described in U.S. Pat. No. 2,984,641 to Leon E. Wolinski patented May 16, 1961.

Other suitable organo titanates are the organo titanium chelates such as tetraoctylene glycol titanium, triethanol amine titanate, titanium acetyl acetonate, titanium lactate and the like.

The alkylene-alkyl acrylate copolymers with which the polysiloxanes are reacted to form the silane modified copolymers are known copolymers produced by reacting an alkene with an alkyl acrylate.

Suitable alkenes are ethylene, propylene, butene-1, isobutylene, pentene-1, 2-methylbutene-1, 3-methylbutene-1, hexene, heptene-1, octene-1, vinyl chloride, styrene and the like and mixtures thereof.

The alkylene moiety of the alkylene-alkyl acrylate copolymer generally contains from 2 to 18 carbon atoms incusive, preferably 2 to 3 carbon atoms inclusive.

Suitable alkyl acrylate monomers which are copolymerized with the alkenes fall within the scope of the following formula:

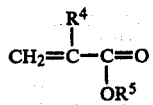

Formula IV wherein $R^4$ is hydrogen or methyl and $R^5$ is alkyl having one to 8 carbon atoms inclusive. Illustrative compounds encompassed by this formula are: methyl acrylate, ethyl acrylate, t-butyl acrylate, methyl methacrylate, n-butyl acrylate, n-butyl methacrylate, 2-ethylhexyl acrylate and the like.

Alkylene-alkyl acrylate copolymers generally have a density (ASTM D 1505) with conditioning as in ASTM D 147-72) of about 0.92 to about 0.94 and a melt index (ASTMD-1238 of 44 psi tested pressure) of about 0.5 to about 500 decigrams per minute.

For purposes of the present invention, the preferred copolymer, generally a copolymer of ethylene-ethyl acrylate, has about one to about 50 percent by weight combined alkyl acrylate, preferably having about 2 to about 40 percent by weight combined alkyl acrylate.

The production of a silane modified copolymer of an alkylene-alkyl acrylate is carried out by reaction of a mixture containing a copolymer of an alkylene-alkyl acrylate, a polysiloxane and an organo titanate wherein the amount of organo titanate is as previously defined and the amount of polysiloxane is generally about 0.05 to about 10, preferably about 0.3 to about 5 percent by weight, based on the weight of the copolymer.

The temperature at which this reaction is carried out is kept below about 180° C. in order to minimize scorch. Higher temperatures can be employed in situations wherein a scorch inhibitor is added to the compositions.

The reaction can be carried out at atmospheric, subatmospheric or superatmospheric pressure, although atmospheric pressure is preferred.

Completion of the reaction is evidenced by measurement of no further viscosity change.

Recovery of the silane modified copolymer is effected by allowing the contents of the reaction flask to cool and discharging to a suitable receiver for storage preferably under an inert gas blanket.

Formulation of the compositions of this invention and the reaction thereof to water curable, silane modified alkylene-alkyl acrylate copolymers can be carried out in any suitable apparatus, preferably an apparatus in which the composition is subjected to mechanical working such as a Brabender mixer, a Banbury mixer or an extruder.

In formulating the compositions, it is preferred to admix the polysiloxane and the organo titanate and to then add the mixture to the alkylene-alkyl acrylate copolymer. Alternatively, the components of the compositions can be admixed individually.

In extrusion applications, it has been found preferable to soak the copolymers with the organo titanate, to feed the polysiloxanes to the soaked compositions and thereafter to extrude the compositions onto a wire or cable.

The curing or crosslinking of the silane modified alkylene-alkyl acrylate copolymer and compositions based thereon is effected by exposing the copolymer to moisture. The moisture present in the atmosphere is usually sufficient to permit curing to occur over a period of 48 hours.

The rate of curing, in a matter of 30 minutes, can be accelerated by exposure to an artificially humidified atmosphere or immersion in water, and heating to elevated temperatures or by exposure to steam.

Generally, curing is effected at temperatures on the order of about 23° C. to about 100° C., preferably about 70° to about 100° C.

Additionally, the crosslinking may be carried out in the presence of a silanol condensation catalyst, although the crosslinking reaction can be carried out at significant rates in the absence of added silanol condensation catalyst.

A wide variety of materials which function as silanol condensation catalysts and which are known in the art can be employed in the crosslinking process. Such materials include metal carboxylates such as dibutyltin dilaurate; organic bases such as ethylamine, hexylamine, dibutylamine and piperidine and the like and acids such as mineral acids and fatty acids and the like.

To the silane modified copolymers can be added various additives in amounts well known in the art. The addition can be accomplished prior to the formation of the silane modified copolymers, as illustrated by the examples which follow or the additives can be added to the preformed, silane modified copolymers.

Exemplary of such additives are those disclosed in my U.S. Pat. No. 4,328,323 and U.S. Pat. No. 4,353,997, granted Oct. 12, 1982, the disclosures of which are incorporated herein by reference.

As previously stated, the compositions of this invention can contain hydrous and/or water-releasing fillers as previously discussed.

These fillers, which are generally used in amounts of about 1 to about 250 percent by weight based on the total weight of the copolymer can be exemplified by the following: hydrous fillers such as hydrous clay, carbon black, zinc borate, talc, precipitated calcium carbonate, basic magnesium carbonate and the like; water-releasing fillers such as aluminum trihydrate, magnesium hydroxide, calcium hydroxide, barium hydroxide, zinc hydroxide and the like.

As previously stated, particularly desirable compositions comprise a water curable, silane modified alkylene-alkyl acrylate copolymer, an organo titanate, aluminum trihydrate or magnesium hydroxide and a scorch inhibiting compound.

Among suitable scorch inhibiting compounds can be noted alcohols, particularly alcohols having a boiling point higher than 100° C. such as octanol, decanol, dodecanol, myristyl alcohol, stearyl alcohol and the like. Also suitable are esters of such alcohols such as dioctyl phthalate, dioctyl adipate, dioctyl succinate and the like.

Plasticizers for vinyl resins are also suitable as scorch inhibiting compounds. These plasticizers include cyclic plasticizers such as phthalate plasticizers among which can be noted butyl decyl phthalate, butyl octyl phthalate, dibutyl phthalate, dicyclohexyl phthalate, dicyclooctyl phthalate and the like. Phosphate esters such as cresyl diphenyl phosphate, 2-ethylhexyl diphenyl phosphate, triphenyl phosphate and the like; trimellitic acid esters such as the n-octyl and n-decyl ester of trimellitic acid and the like; acylic plasticizers such as the di(2-(2-butoxyethoxy)ethyl) ester of adipic acid, the di(2-ethylhexyl) ester of adipic acid, the diisodecyl ester of adipic acid and the like; oleic acid esters such as butyl oleate, glyceryl trioleate, methyloleate and the like as further disclosed in a publication entitled *Vinyl Plasticizers*, Report No. 62, April 1970, Standford Research Institute, Menlo Park, Calif.

Suitable scorch inhibiting compounds, that is compounds which reduce scorch and do not undergo a crosslinking reaction with the components of the composition to which they are added are used in amounts sufficient to reduce scorch, generally in amounts of about 0.5 to about 20 percent by weight, preferably about 2 to about 10 percent by weight based on the weight of the total composition.

In the following examples, which are exemplary of the present invention, procedures conducted with respect to Examples and Control of Table I were as follows:

To a Brabender mixer, preheated to a temperature of 170° C., there was charged an ethylene-ethyl acrylate copolymer, containing 22 percent by weight combined ethyl acrylate and having a melt index of 6.5, aluminum trihydrate and 1,2-dihydro-2,3,4-trimethyl quinoline, an antioxidant. This mixture was fluxed and to the fluxed mixture there was then added a silane coupling agent, n-octyltriethoxy silane. The resultant mixture was then mixed for five minutes under an argon gas flow. To the mixture, there was then added polysiloxane and organo titanate, individually or as a preformed mixture. The reaction mixture was maintained at a temperature of 170° C. for five minutes. During the last half minute of this five minute period, dibutyltin dilaurate was added by means of a syringe. The contents of the Brabender were then rapidly discharged, the recovered composition, containing a water curable, silane modified ethylene-ethyl acrylate copolymer, was flattened in a press between teflon sheets and stored in a double lined polyethylene bag, under argon gas, which was placed in a dry box.

Samples of the compositions were used to prepare test plaques, having dimensions of 3 inches by 3 inches by 0.150 inch in a press under the following conditons:
Pressure = 5000 psi
Temperature = ~150° C.
Time Cycle = 15 minutes Test plaques were subjected to the Monsanto Rheometer test, described in detail in U.S. Pat. No. 4,018,852 granted Apr. 19, 1977.

Monsanto Rheometer tests, reported in inch-lbs, were conducted on uncured test plaques as well as on cured test plaques, cured by being placed in a water bath, maintained at a temperature of 80° C., for three hours.

Monsanto Rheometer test results were then used to determine Percent Scorch, Percent Grafting Efficiency and the System Efficiency according to the following:

$$\text{Percent Scorch} = \frac{\text{Rheometer Before} - \text{Initial}}{\text{Rheometer After} - \text{Initial}} \times 100$$

Before—Monsanto Rheometer test results with respect to uncured plaques
After—Monsanto Rheometer test results with respect to cured plaques
Initial—Monsanto Rheometer test results with respect to plaques produced from compositions which did not contain organo titanate or polysiloxane $$\text{Percent Grafting Efficiency} = \frac{\text{Rheometer After} - \text{Initial}}{\text{Rheometer of Ex. 6 (After)} - \text{Initial}} \times 100$$

Example 6, having the highest Rheometer reading (after), was considered as 100 percent efficient.

Initial = 4 inch-lbs $$\text{System Efficiency} = \frac{\text{Percent Grafting Efficiency}}{\text{Percent Scorch}}$$

According to the results:
A higher Monsanto Rheometer value indicates a greater degree of cure.
A higher Percent Scorch value indicates greater scorch.
A higher Percent Grafting Efficiency indicates more complete reaction or grafting of polysiloxane onto the alkylene-alkyl acrylate copolymer.
Amounts noted in the Examples of this specification are in parts by weight.

TABLE I

|  | Control 1 | 1 | 2 | 3 | 4 |
|---|---|---|---|---|---|
| Ethylene-Ethyl Acrylate Copolymer | 39.22 | 39.0 | 38.9 | 38.9 | 38.9 |
| Aluminum Trihydrate | 58.92 | 58.30 | 58.10 | 58.10 | 57.50 |
| n-Octyltriethoxy Silane | 0.59 | 0.59 | 0.59 | 0.59 | 0.59 |
| 1,2-Dihydro-2,3,4-Trimethyl Quinoline | 0.59 | 0.59 | 0.59 | 0.59 | 0.59 |
| Polysiloxane-Example 3 of U.S. Pat. No. 4,328,323 | 0.60 | 0.60 | 0.60 | 0.60 | 0.60 |
| Tetraisopropyl Titanate | 0.06 | 0.90 | 1.20 | 1.20 | 1.80 |
| Dibutyltin Dilaurate | 0.02 | 0.02 | 0.02 | 0.02 | 0.02 |
| Ratio - Titanate/Polysiloxane | 0.1 | 1.5 | 2.0 | 2.0 | 3.0 |
| Monsanto Rheometer - Inch-Lbs |  |  |  |  |  |
| Before | 4 | 19 | 20 | 28 | 9 |
| After | 4 | 55 | 62 | 80 | 65 |
| Percent Scorch | — | 29.4 | 27.6 | 31.6 | 8.2 |
| Percent Grafting Efficiency | 0.0 | 67.1 | 76.3 | 100 | 80.2 |
| System Efficiency | — | 2.28 | 2.76 | 3.16 | 9.78 |

In carrying out Example 6 and Controls 3 and 4, the polysiloxane produced as described in Example 3 of U.S. Pat. No. 4,328,323 and the tetraisopropyl titanate were premixed and then added to the Brabender mixer.

The polysiloxane of the Examples contains the unit:

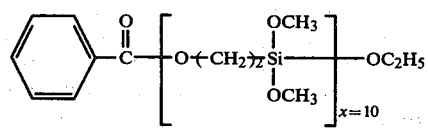

Compositions, the formulations of which are set forth in Table II were prepared and reacted as described below, formed into plaques and the plaques subjected to the Monsanto Rheometer test. Test results are also set forth in Table II.

A 300 gram Brabender mixer was preheated to a temperature of 200° C., under an argon gas flow, and charged with an ethylene-ethyl acrylate copolymer (same as in Example 1), aluminum trihydrate and 1,2-dihydro-2,3,4-trimethyl -quinoline while under an argon gas flow. The charge was mixed for five minutes while the temperature was allowed to drop from 200° C. to 185° C. At the end of the five minute period, n-octyltriethoxy silane was added to the contents of the Brabender and the resultant mixture maintained at a temperature of 185° C. while being mixed. At this point, the following additions were made in the order indicated, while the argon flow was continued.

Dodecanol: mixing continued for an additional minute (Examples 6 through 9)

Organo Titanate and Polysiloxane: individually syringed into the Brabender (Examples 5 through 9)

Mixing was continued for another 4.5 minutes while the contents of the flask were maintained at a temperature of 185° C., allowing the polysiloxane to react with the ethylene-ethyl acrylate copolymer. Dibutyltin dilaurate was then added and the contents of the Brabender mixed for another 0.5 minutes.

Recovery of the product, preparation of test plaques and test determinations were carried out as described with respect to Examples 1 through 4.

TABLE II

|  | 5 | 6 | 7 | 8 | 9 |
|---|---|---|---|---|---|
| Ethylene-Ethyl Acrylate Copolymer | 38.4 | 36.5 | 33.6 | 34.5 | 34.25 |
| Aluminum Trihydrate | 57.6 | 57.6 | 57.6 | 58.7 | 58.7 |
| n-Octyltriethoxy Silane | 0.49 | 0.49 | 0.49 | 0.49 | 0.49 |
| 1,2-Dihydro-2,3,4-trimethyl Quinoline | 0.58 | 0.58 | 0.58 | 0.59 | 0.59 |
| Dodecanol | 0.00 | 1.91 | 4.81 | 4.94 | 4.94 |
| Polysiloxane-Example 3 of U.S. Pat. No. 4,328,323 | 0.96 | 0.96 | 0.96 | 0.49 | 0.49 |
| Tetraisopropyl Titanate | 1.92 | 1.91 | 1.91 | 0.24 | 0.49 |
| Dibutyltin Dilaurate | 0.05 | 0.05 | 0.05 | 0.05 | 0.05 |
| Ratio - Titanate/Polysiloxane | 2.0 | 2 | 2 | 0.5 | 1.0 |
| Monsanto Rheometer |  |  |  |  |  |
| Before | 51 | 22 | 10 | 2.5 | 6 |
| After | 80 | 83 | 80 | 6.0 | 20 |
| Percent Scorch | 61.5 | 21.7 | 7.9 | — | 10 |
| Percent Grafting Efficiency | 96.2 | 100 | 96.2 | 2.5 | 20.3 |
| System Efficiency | 1.6 | 4.6 | 12.2 | — | 2.0 |

In determining Percent Grafting Efficiency of Examples 5 through 9, the Rheometer value (after) of Example 6 was used.

Compositions, the formulations of which are set forth in Table III, were prepared, reacted, formed into plaques and tested in a manner described with respect to the composition of Example 1, with the exception that various reaction temperatures were used. Reaction temperatures and test results are set forth in Table III.

TABLE III

|  | 10 | 11 | 12 | 13 | 14 |
|---|---|---|---|---|---|
| Ethylene-Ethyl Acrylate Copolymer (Same as in Example 1) | 35.9 | 35.9 | 35.9 | 35.9 | 33.86 |
| Aluminum Trihydrate | 58.2 | 58.2 | 58.2 | 58.2 | 58.3 |
| n-Octyltriethoxy Silane | 0.58 | 0.58 | 0.58 | 0.58 | 0.58 |
| 2-Ethylhexyl Diphenyl Phosphate | 2.9 | 2.9 | 2.9 | 2.9 | 4.85 |
| 1,2-Dihydro-2,3,4-Trimethyl Quinoline | 0.59 | 0.59 | 0.59 | 0.59 | 0.58 |
| Polysiloxane-Example 3 of U.S. Pat. No. 4,328,323 | 0.6 | 0.6 | 0.6 | 0.6 | 0.6 |
| Tetraisopropyl Titanate | 1.2 | 1.2 | 1.2 | 1.2 | 1.2 |
| Ratio - Titanate/Polysiloxane | 2.0 | 2.0 | 2.0 | 2.0 | 2.0 |
| Dibutyltin Dilaurate | 0.03 | 0.03 | 0.03 | 0.03 | 0.03 |
| Reaction Temperature °C. | 140 | 150 | 160 | 170 | 160 |
| Monsanto Rheometer-Inch-lbs |  |  |  |  |  |
| Before | 5.2 | 5.2 | 9.0 | 10 | 7 |
| After | 29 | 40 | 60 | 62 | 46 |
| Percent Scorch | 4.8 | 3.3 | 8.9 | 10.3 | 7.1 |
| Percent Grafting Efficiency | 43 | 62 | 96 | 100 | 72 |
| System Efficiency | 9.0 | 18.8 | 10.8 | 9.7 | 10.1 |

In determining Percent Grafting Efficiency, the Rheometer value (after) of Example 13 was used.

Compositions, the formulations of which are set forth in Table IV, were prepared and reacted in a manner described with respect to the composition of Example 1 and tested for flame retardancy by the Limiting Oxygen Index Text (ASTMD-2863-70).

TABLE IV

|  | 15 | 16 | 17 | 18 |
|---|---|---|---|---|
| Ethylene-Ethyl Acrylate Copolymer (Same as in Example 1) | 38.4 | 36.5 | 34.6 | 36.5 |
| Aluminum Trihydrate | 57.6 | 57.6 | 57.6 | — |
| Magnesium Hydroxide | — | — | — | 57.6 |
| n-Octyltriethoxy Silane | 0.48 | 0.48 | 0.48 | 0.48 |
| 1,2-Dihydro-2,3,4-Trimethyl Quinoline | 0.59 | 0.58 | 0.59 | 0.58 |
| Polysiloxane-Example 3 of U.S. Pat. No. 4,328,323 | 0.96 | 0.96 | 0.96 | 0.96 |
| Tetraisopropyl Titanate | 1.92 | 1.92 | 0.92 | 1.92 |
| Ratio - Titanate/Polysiloxane | 2.0 | 2.0 | 2.0 | 2.0 |
| Dibutyltin Dilaurate | 0.05 | 0.05 | 0.05 | 0.05 |
| Dodecanol | — | 1.91 | 4.8 | 1.91 |
| Limiting Oxygen Index | 30 | 30 | 30 | 33 |

The Limiting Oxygen Index of the ethylene-ethyl acrylate copolymer per se is on the order of 17.5–18.

Compositions, the formulations of which are set forth in Table V, were dried for 4 hours under a nitrogen gas flow to a water content of 190 ppm, determined using a Mitsubishi Model CA-02 water analyzer. Compositions were then fed to the hopper of a 2½ inch, 24 to 1 inch (length to diamater) Royle Extruder. To the compositions, were added tetraisopropyl titanate and polysiloxane (Example 3 of U.S. Pat. No. 4,328,323), singly and continuously, effecting a contact time with the basic composition of 1.5 to 1.8 minutes. The resultant reacted mixture was extruded onto a #14 AWG solid copper wire at an output of 200 lbs per hour, under a temperature gradient of 70° C. to 195° C.

In each case, the coated wire was fed through a water trough, which was at ambient temperatures and allowed to stand for one week at ambient conditions.

Material was then stripped from each wire, deformed into plaques, having dimensions of 3 inches by 8 inches by 0.125 inch, in a press under the following conditions:
Pressure=5000 psi Temperature = 150° C.
Time Cycle = 15 minutes
Test results are also set forth in Table V.

TABLE V

|  | Control 5 | 19 |
| --- | --- | --- |
| Ethylene-Ethyl Acrylate Copolymer Containing 15-17 Percent By Weight Ethyl Acrylate And Having A Melt Index of 1.3 | 56 | 56 |
| Talc Coated With Zinc Stearate | 21 | 21 |
| Calcium Carbonate Coated With Calcium Stearate | 2.5 | 2.5 |
| Ethylene-bis(tetrabromo-phthalimide) | 16.4 | 16.4 |
| Antimony Oxide | 2.5 | 2.5 |
| 1,2-Dihydro-2,3,4-Trimethyl Quinoline | 0.6 | 0.6 |
| Vinyl tris(2-Methoxyethoxy) Silane | 1.0 | 1.0 |
| Tetraisopropyl Titanate | 0.35 | 1.15 |
| Polysiloxane-Example 3 of U.S. Pat. No. 4,328,323 | 1.18 | 0.56 |
| Ratio - Titanate/Polysiloxane | 0.3 | 2 |
| Rheometer - Inch-Lbs | 39 | 35 |
| Percent Varience in Thickness Of Coating On Wire | 6.3 | 1.5 |

Compositions, the formulations of which are set forth in Table VI, were prepared as described with respect to the compositions of Table I with the exception of reaction time and temperature.

Reaction time, temperature, tests and results thereof are set forth in Table VI.

TABLE VI

|  | 20 | 21 | 22 | 23 | 24 | 25 | 26 | 27 |
| --- | --- | --- | --- | --- | --- | --- | --- | --- |
| Ethylene-Ethyl Acrylate Copolymer Containing 17-19 Percent By Weight Combined Ethyl Acrylate And Having A Melt Index of 3.5-4.0 | 38.8 | 38.8 | 35.9 | 35.9 | 35.9 | 35.9 | 35.9 | 35.9 |
| Aluminum Trihydrate (Dried) | 58.2 | 58.2 | 58.2 | 58.2 | 58.2 | 58.2 | 58.2 | 58.2 |
| Octyl Triethoxy Silane | 0.59 | 0.59 | 0.59 | 0.59 | 0.59 | 0.59 | 0.59 | 0.59 |
| 1,2-Dihydro-3,4,5-Trimethyl Quinoline | 0.59 | 0.59 | 0.59 | 0.59 | 0.59 | 0.59 | 0.59 | 0.59 |
| Polysiloxane-Example 3 of U.S. Pat. No. 4,328,323 | 0.59 | 0.59 | 0.59 | 0.59 | 0.59 | 0.59 | 0.59 | 0.59 |
| Tetraisopropyl Titanate | 1.2 | 1.2 | 1.2 | 1.2 | 1.2 | 1.2 | 1.2 | 1.2 |
| Ratio - Titanate/Polysiloxane | 2 | 2 | 2 | 2 | 2 | 2 | 2 | 2 |
| Dibutyltin Dilaurate | 0.03 | 0.03 | 0.03 | 0.03 | 0.03 | 0.03 | 0.03 | 0.03 |
| Dodecanol | — | — | 2.9 | 2.9 | — | — | — | — |
| Dioctyl Sebacate | — | — | — | — | 2.9 | 2.9 | — | — |
| 2-Ethylhexyl Diphenyl Phosphate | — | — | — | — | — | — | 2.9 | 2.9 |
| Reaction Time (Minutes) | 2 | 4 | 2 | 4 | 2 | 4 | 2 | 4 |
| Temperature (°C.) | 180 | 180 | 180 | 180 | 180 | 180 | 180 | 180 |
| Rheometer - Inch-Lbs |  |  |  |  |  |  |  |  |
| Before | 35 | 35 | 15 | — | 8 | 15 | 13 | 22 |
| After | 68 | 64 | 76 | — | 52 | 53 | 55 | 60 |
| Percent Scorch | 48 | 52 | 15.3 | — | 8.3 | 22 | 17.6 | 32 |
| Grafting Efficiency | 89 | 83 | 100 | — | 67 | 68 | 71 | 78 |

It is to be understood that in formulating the compositions of this invention, mixtures of compounds can be used.

Also, mixtures of reactants can be used in preparing the polysiloxanes, titanates and silane modified copolymers.

Although the present invention has been described in reference to water curable, silane modified alkylene-alkyl acrylate copolymers, it is to be understood that formulation of water curable compositions containing an organo titanate, aluminum trihydrate and an antiscorch compound can be based on such polymers as water curable, silane modified, low density polyethylene, high density polyethylene, ethylene-propylene rubbers, ethylene-propylene-diene rubbers, ethylene-propylene-hexene terpolymers, polyalkyl acrylates and the like.

What is claimed is:

1. A composition comprising a polysiloxane containing the repeating unit:

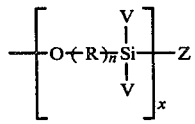

wherein R is a hydrocarbon radical or an oxy substituted hydrocarbon radical, each V is hydrogen, a hydrocarbon radical or a hydrolyzable group, Z is a hydrolyzable group, n is an integer having a value of 1 to 18 inclusive and x is an integer having a value of at least 2, and an organo titanate in an amount sufficient to inhibit the adverse effects of moisture.

2. A composition comprising a polysiloxane containing the repeating unit:

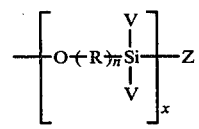

wherein R is a hydrocarbon radical or an oxy substituted hydrocarbon radical, each V is hydrogen, a hydrocarbon radical or a hydrolyzable group, Z is a hydrolyzable group, n is an integer having a value of 1 to 18 inclusive and x is an integer having a value of at least 2, and an organo titanate wherein the weight ratio of organo titanate to polysiloxane is at least about 0.5 to one.

3. A composition comprising a polysiloxane containing the repeating unit:

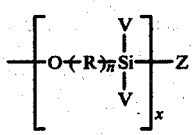

wherein R is a hydrocarbon radical or an oxy substituted hydrocarbon radical, each V is hydrogen, a hydrocarbon radical or a hydrolyzable group, Z is a hydrolyzable group, n is an integer having a value of 1 to 18 inclusive and x is an integer having a value of at least 2, and an organo titanate wherein the weight ratio of organo titanate to polysiloxane is about 1.5 to about 10 to one.

4. A composition comprising a polysiloxane containing the repeating unit:

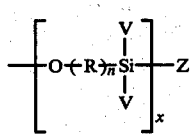

wherein R is a hydrocarbon radical or an oxy substituted hydrocarbon radical, each V is hydrogen, a hydrocarbon radical or a hydrolyzable group, Z is a hydrolyzable group, n is an integer having a value of 1 to 18 inclusive and x is an integer having a value of at least 2, and an organo titanate having the formula:

$Ti(OR^2)_4$ wherein each $R^2$ is hydrogen or a hydrocarbon radical provided that at least one $R^2$ is a hydrocarbon radical, wherein the weight ratio of organo titanate to polysiloxane is about 1.5 to about 5 to one.

5. A composition as defined in claim 4 wherein R of the polysiloxane is an alkylene radical having one to 18 carbon atoms inclusive, each V of the polysiloxane is an alkoxy radical having 1 to 18 carbon atoms inclusive and Z of the polysiloxane is an alkoxy radical having one to 18 carbon atoms inclusive.

6. A composition as defined in claim 4 wherein the organo titanate is tetraisopropyl titanate or tetrabutyl titanate.

7. A composition as defined in claim 4 wherein R of the polysiloxane is —CH$_2$—CH$_2$— and V and Z of the polysiloxane are methoxy.

8. A composition as defined in claim 7 wherein the organo titanate is tetraisopropyl titanate or tetrabutyl titanate.

9. A composition as defined in claim 4 wherein x of the polysiloxane has a value of 5 to 25 inclusive.

10. A composition as defined in claim 4 wherein the polysiloxane has the formula:

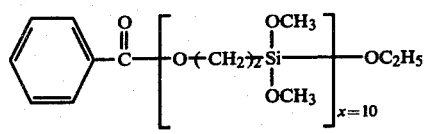

and the organo titanate is tetraisopropyl titanate.

11. A composition, capable of reaction to produce a water curable, silane modified alkylene-alkyl acrylate copolymer comprising an alkylene-alkyl acrylate copolymer, an organo titanate in an amount sufficient to inhibit the adverse effects of moisture and a polysiloxane containing the repeating unit:

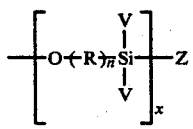

wherein R is a hydrocarbon radical or an oxy substituted hydrocarbon radical, each V is hydrogen, a hydrocarbon radical or a hydrolyzable group, Z is a hydrolyzable group, n is an integer having a value of 1 to 18 inclusive and x is an integer having a value of at least 2.

12. A composition, capable of reaction to produce a water curable, silane modified alkylene-alkyl acrylate copolymer, comprising an alkylene-alkyl acrylate copolymer, a polysiloxane containing the repeating unit:

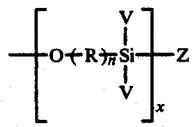

wherein R is a hydrocarbon radical or an oxy substituted hydrocarbon radical, each V is hydrogen, a hydrocarbon radical or a hydrolyzable group, Z is a hydrolyzable group, n is an integer having a value of 1 to 18 inclusive and x is an integer having a value of at least 2, and an organo titanate wherein the weight ratio of organo titanate to polysiloxane is at least about 0.5 to one.

13. A composition as defined in claim 12 wherein the weight ratio of organo titanate to polysiloxane is about 1.5 to about 10 to one.

14. A composition as defined in claim 12 wherein the organo titanate has the formula:

$Ti(OR^2)_4$ wherein each $R^2$ is hydrogen or a hydrocarbon radical provided that at least one $R^2$ is a hydrocarbon radical.

15. A composition as defined in claim 12 wherein the said copolymer is an ethylene-ethyl acrylate copolymer.

16. A composition as defined in claim 12 wherein R of the polysiloxane is an alkylene radical having 1 to 18 carbon atoms inclusive, each V of the polysiloxane is an alkoxy radical having 1 to 18 carbon atoms inclusive and Z of the polysiloxane is an alkoxy radical having 1 to 18 carbon atoms inclusive.

17. A composition as defined in claim 14 wherein the organo titanate is tetraisopropyl titanate or tetrabutyl titanate.

18. A composition as defined in claim 12 wherein R of the polysiloxane is —CH$_2$—CH$_2$— and V and Z of the polysiloxane are methoxy.

19. A composition as defined in claim 18 wherein the organo titanate is tetraisopropyl titanate or tetrabutyl titanate.

20. A composition as defined in claim 12 wherein x of the polysiloxane has a value of 5 to 25 inclusive.

21. A composition as defined in claim 12 wherein the said copolymer is an ethylene-ethyl acrylate copolymer, the organo titanate is tetraisopropyl titanate and the polysiloxane contains the unit:

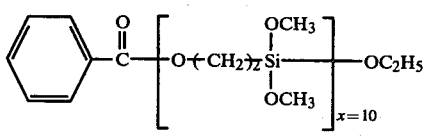

22. A composition as defined in claim 12 containing a hydrous filler or a water-releasing filler.

23. A composition as defined in claim 22 wherein the filler is aluminum trihydrate.

24. A wire or cable having thereon a composition or the cured product of the composition defined in claim 12.

25. A composition comprising a water curable, silane modified polymer, an organo titanate, aluminum trihydrate or magnesium hydroxide and a scorch inhibiting compound.

26. A composition comprising a water curable, silane modified alkylene-alkyl acrylate copolymer, an organo titanate, aluminum trihydrate or magnesium hydroxide and a scorch inhibiting compound.

27. A composition as defined in claim 26 wherein the scorch inhibiting compound is dodecanol.

28. A composition as defined in claim 26 wherein the scorch inhibiting compound is 2-ethylhexyl diphenyl phosphate.

29. A composition as defined in claim 25 wherein the said copolymer is a water curable, silane modified ethylene-ethyl acrylate copolymer.

30. The cured product of the composition defined in claim 25.

31. A wire or cable having thereon a composition or the cured product of the composition defined in claim 25.

32. A method of applying a coating onto a wire or cable which comprises soaking an alkylene-alkyl acrylate copolymer with an organo titanate, admixing a polysiloxane with the soaked copolymer and extruding the resultant material onto a wire or cable.

* * * * *

UNITED STATES PATENT AND TRADEMARK OFFICE
CERTIFICATE OF CORRECTION

PATENT NO. : 4,446,279
DATED : May 1, 1984
INVENTOR(S) : Michael J. Keogh

It is certified that error appears in the above—identified patent and that said Letters Patent is hereby corrected as shown below:

Column 2, line 6, "preceeding" should read -- preceding --

Column 2, line 41, "containing" should read -- contain --

Column 2, line 53, after "group" (second occurrence), change the comma to a semi-colon Column 10, line 54, "diamater" should read -- diameter --

Claim 29, line 1, "25" should read -- 26 --

Signed and Sealed this

Twenty-third Day of October 1984

[SEAL]

Attest:

Attesting Officer

GERALD J. MOSSINGHOFF

Commissioner of Patents and Trademarks

UNITED STATES PATENT AND TRADEMARK OFFICE
CERTIFICATE OF CORRECTION

PATENT NO. : 4,446,279
DATED : May 1, 1984
INVENTOR(S) : Michael J. Keogh

It is certified that error appears in the above-identified patent and that said Letters Patent is hereby corrected as shown below:

Column 8, line 50    "Example 6 and Controls 3 and 4" should read -- Example 3 and Control 1 --

Column 11, line 6    "Control 5" should read -- Control 2 --

Signed and Sealed this

Twenty-eighth Day of January 1986

[SEAL]

Attest:

DONALD J. QUIGG

Attesting Officer    Commissioner of Patents and Trademarks